United States Patent
Wang (10) Patent No.: US 9,620,913 B2
(45) Date of Patent: Apr. 11, 2017

(54) FLAT OPTICAL FIBER LIGHT-STREAMING CABLE

(71) Applicant: SURE-FIRE ELECTRICAL CORPORATION, New Taipei (TW)

(72) Inventor: Chang-Pin Wang, New Taipei (TW)

(73) Assignee: Sure-Fire Electrical Corporation, New Taipei (TW)

( * ) Notice: Subject to any disclaimer, the term of this patent is extended or adjusted under 35 U.S.C. 154(b) by 113 days.

(21) Appl. No.: 14/809,361

(22) Filed: Jul. 27, 2015

(65) Prior Publication Data

US 2017/0033514 A1    Feb. 2, 2017

(51) Int. Cl.

| G02B 6/12 | (2006.01) |
|---|---|
| H01R 13/66 | (2006.01) |
| H01R 13/717 | (2006.01) |
| F21V 8/00 | (2006.01) |
| H01R 27/02 | (2006.01) |

(52) U.S. Cl.
CPC ......... *H01R 13/7175* (2013.01); *G02B 6/001* (2013.01); *G02B 6/0006* (2013.01); *H01R 27/02* (2013.01)

(58) Field of Classification Search
None
See application file for complete search history.

(56) References Cited

U.S. PATENT DOCUMENTS

| 2004/0042735 A1* | 3/2004 | Ma | H01R 13/6641 385/88 |
| 2004/0071410 A1* | 4/2004 | Ma | H01R 13/6641 385/88 |
| 2009/0086469 A1* | 4/2009 | Hutchinson | G02B 6/0001 362/109 |
| 2014/0156879 A1* | 6/2014 | Wong | G06F 11/325 710/19 |

* cited by examiner

*Primary Examiner* — Hemang Sanghavi
(74) *Attorney, Agent, or Firm* — Rosenberg, Klein & Lee (57) ABSTRACT

The present invention provides a flat optical fiber light-streaming cable, wherein a first connection part conforming to the USB specification is installed on one side of the circuit board on which light emitting diodes is installed, and a plurality of junction points are connected to the signal line set and the electric power line set respectively enveloped by a middle cladding layer, optical fibers respectively corresponding to the LEDs and the transparent outer protective layer wrapped on the peripheries thereof are installed between the signal line set and the electric power line set. When the controller drives LEDs to respectively project light sequentially toward the optical fibers, light can pass through the light spots on the surface and present a streamwise lighting state demonstrating successive and progressive light chasings sequentially per segment, thereby presenting various dynamic lighting effects such as blinking color, colorful water flow or the like.

8 Claims, 7 Drawing Sheets

FLAT OPTICAL FIBER LIGHT-STREAMING CABLE

BACKGROUND OF THE INVENTION

1. Field of the Invention

The present invention provides a flat optical fiber light-streaming cable; in particular, the flat optical fiber light-streaming cable according to the present invention is characterized in that the controller in the first plug can drive light emitting diodes (LEDs) to sequentially project light toward the optical fibers in the transmission cable respectively in order to present a stream-wise lighting state demonstrating successive and progressive light chasings sequentially per segment through the light spots arranged at an equal distance on the surface of the optical fibers, thereby presenting various dynamic lighting effects such as blinking color, colorful water flow or the like.

2. Description of Related Art

Conventional illuminating transmission lines typically employ electroluminescent (EL) lines made of EL materials and drive the middle phosphor power layer to illuminate between the central copper line and outer conductive layer by applying alternative current or using a driver to convert direct current into alternative current, while the color of the EL line is determined by the color of the outer protective layer. Some vendors also arrange the main conductive line including the electric power line and the signal line along with multiple EL lines in parallel to wind in a spiral fashion, and regulate the lighting sequence thereof through a controller thus allowing such EL lines to present a segmental illumination effect. As connecting a mobile phone or a tablet computer to a personal computer or a power supply device by way of an illuminating transmission line to recharge electric power, the illuminating transmission line may present a color light flow effect which may vary based on the magnitude of electric current. However, if the illuminating transmission line is folded or bent, the phosphor powder layer therein may easily drop off thus leading to non-uniform lighting problems in operation, or even illumination failures in the illuminating transmission line. Another type of illuminating transmission line may be configured with an instructor lamp on the connector, and upon recharging only the instructor lamp can illuminate but no light is emitted from the transmission line itself, which may lead to difficulties in finding the transmission line in the nighttime or within an environment of poor visibility, thus unable to fulfill the demand for usability in practice.

In order to resolve the aforementioned issues, some vendors developed a type of illuminating transmission line featuring constant lighting and blinking states, which is configured with connectors and a recharging line, and an optical fiber is installed thereon in parallel along the length direction of the recharging line for illuminating in cooperation with the light projected by the LEDs; besides, a light transfer layer is enveloped outside the recharging line and the optical fiber so that a connector on one end of the illuminating transmission line conforming to the USB specification can be connected to the host end of a personal computer or notebook computer etc., while the connector on the other end can be connected to the user end of a mobile device such as a smartphone, a tablet computer or the like to perform data transmission or power recharging operations. Upon recharging the battery in the mobile device, a controller can drive the constant lighting and blinking states of the LEDs based on variations in voltage and current values thus allowing a user to determine the current operating condition of the mobile device by means of the illumination from the optical fiber. Whereas, this type of illuminating transmission line is mostly configured with an illuminating line of single-cored optical fiber whose lighting state is quite flat; i.e., either constant lighting or spot blinking from the single-cored optical fiber, thus comparatively monotonic in its integral lighting effects. Moreover, the point punching on the surface of the single-cored optical fiber is conventionally performed in a slicing approach by using a blade, which is advantageous due to less complicated manufacturing crafts, but the drawbacks thereof may also exist in consistence on spot punching intervals, controls over the punching depths and absence of structural variability. Therefore, improvements on the versatility in lighting effects of illuminating transmission lines and point punching operations for single-cored optical fibers have become critical issues regarding to desirable re-configurations in the industry.

SUMMARY OF THE INVENTION

Hence, in view of the above-said issues and drawbacks in prior art, the inventor of the present invention has collected relevant information, worked on various evaluations and considerations of many aspects, along with long-term research and development experiences from numerous practices and modifications in the related realms, thus creating the innovative flat optical fiber light-streaming cable in accordance with the present invention.

The primary objective of the present invention lies in that, a first connection part conforming to the USB specification is installed on one side of the circuit board in the first plug, a light source module having at least two light emitting diodes (LEDs) is installed on the circuit board, a plurality of junction points on the circuit board are connected to the signal line set and the electric power line set of the transmission cable, the peripheries of the signal line set and the electric power line set are enveloped with a middle cladding layer, at least two optical fibers respectively corresponding to the LEDs and the transparent outer protective layer enveloping on the exterior thereof are configured between the signal line set and the electric power line set, a second plug is configured on the other end of the transmission cable opposite to the first plug, in which, when the controller installed on the circuit board drives the LEDs to respectively project light toward the optical fiber sequentially, light can pass through the light spots arranged at an equal distance on the surfaces of the optical fibers and present a stream-wise lighting state demonstrating successive and progressive light chasings sequentially per segment, thereby presenting various dynamic illuminating effects such as blinking color, colorful water flow or the like and improving the competitive strength of the products.

The secondary objective of the present invention lies in that, a plurality of light spots are configured on the surface of three single-cored optical fibers in the transmission cable to present the stream-wise spotting fashion, in which a flat pressure roller of a point punching machine can roll in conjunction with the three parallel precise tile opening bulging rollers to punch on the optical fibers passing through in between thereby point punching to each of the optical fibers by a plurality of rolling teeth on these tile opening bulging rollers such that a plurality of light spots arranged at an equal distance can be formed on the surfaces of the optical fibers. Such three tile opening bulging rollers include a plurality of rolling teeth formed in accordance with a preset fixed interval using precise molding tools can ensure the distance between the light spots punched on each optical fiber to be identical, and the consistence on the punched depths of such points may be maintained by controlling the constant pressure applied on the flat pressure roller, so the integral illuminating effect can be better coordinated and more versatile thus improving the usability and aesthetic feature thereof.

Another objective of the present invention lies in that, a fixation base is combined to the exterior of the LEDs in the light source module, a plurality of through-channels arranged in a lateral interval are installed in the interior of the fixation base for individually inserting the LEDs into the through-channels, the positioning holes having a smaller hole diameter are installed in penetration on the rear side of the through-holes thereby allowing the optical fibers to be individually inserted into the positioning holes of the fixation base, such that the terminal plane of the optical fibers can be closely abutted against the LEDs via the guidance of the positioning holes for aligned connections thus providing good dustproof, antifouling features through the covering of the fixation base.

Yet another objective of the present invention lies in that, the first plug is connected to a host end on a personal computer, a notebook computer etc., and the controller on the circuit board may drive the LEDs conjunctively with the optical fibers to simulate the flow direction and state about the signal transmission or power recharging operations; in case the electricity amount in the mobile device or apparatus connected to the second connection part of the second plug is below 65%, the controller can modulate the LEDs so that the illumination flow speed at the light spots on the optical fibers may be faster; on the contrary, in case the electricity amount exceeds 65%, the flow speed at the light spots on the optical fibers may be slower; whereas, if the electricity amount of the mobile device or apparatus is saturated, the controller automatically stops driving the illumination of the LEDs.

DETAILED DESCRIPTION OF THE PREFERRED EMBODIMENTS

To achieve the aforementioned objective and effects, with regards to the technical means and structures utilized in the present invention, the structures and functions thereof will be hereunder set forth by the details descriptions concerning the preferred embodiments of the present invention along with appended drawings in order to comprehensively understand the present invention.

Refer now to FIGS. 1, 2, 3, 4 and 5, wherein a stereo perspective view, a stereo disassembly view, a stereo disassembly view from another angle of view, an electric circuit diagram for the circuit board and a cross-section view for the transmission cable, and also a diagram for the optical fibers upon performing the pressure punching operation as well as a state diagram for the optical fibers upon performing the light-streaming operation, in accordance with the present invention are respectively shown. It can be clearly seen from the Figures that the flat optical fiber light-streaming cable according to the present invention comprises a first plug 1, a transmission cable 2 and a second plug 3, whose major components as well as characteristics will be set forth in details as below, wherein:

The first plug 1 comprises a circuit board 11, a first connection part 12 is installed on the front side of the circuit board 11, a light source module 13 having at least two light emitting diodes (LEDs) 131 is installed on the circuit board 11, and a USB interface circuit 111, a processing circuit 112, a controller 113 and a plurality of junction points 114 are installed on the surface of one side or both sides of the circuit board 11. In addition, a processing circuit 112 can be connected respectively to the USB interface circuit 111, controller 113 and junction points 114 via connection lines to form an electrically conductive path, and the pins of each LED 131 are welded to corresponding junction points of the controller 113 for electric connections. Besides, the first connection part 12 includes a base 121, a terminal set 122 is positioned on the base 121 and welded to corresponding junction points on the USB interface circuit 111 for electric connections, the exterior of the base 121 is combined with a shielding shell 123 thus constructing a slot between the interior of the shielding shell 123 and the base 121.

Figure 2:
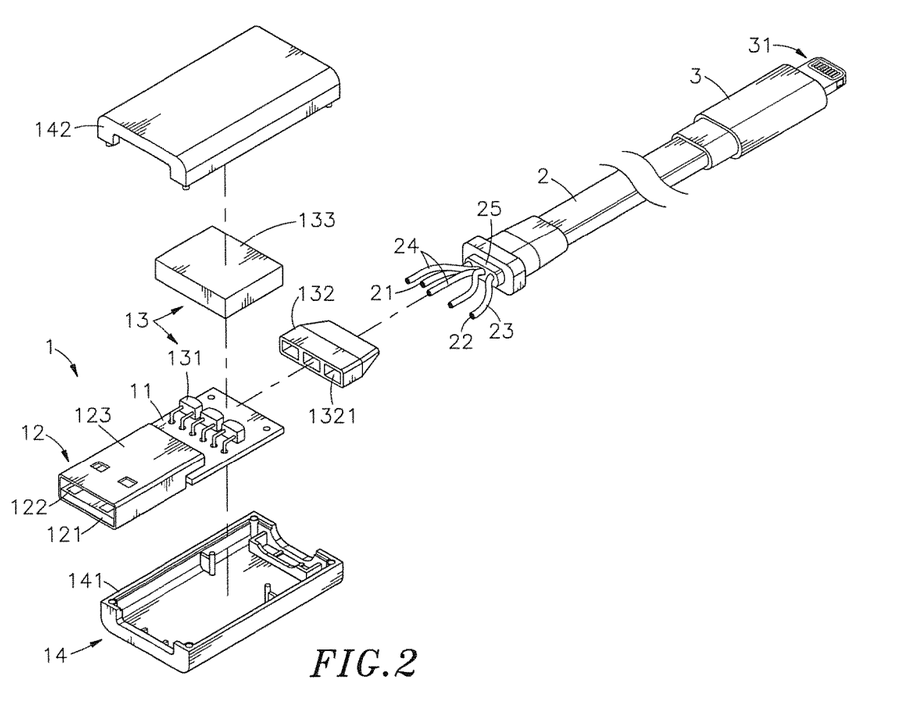
FIG. 2 shows a stereo disassembly view of the present invention.
Figure 3:
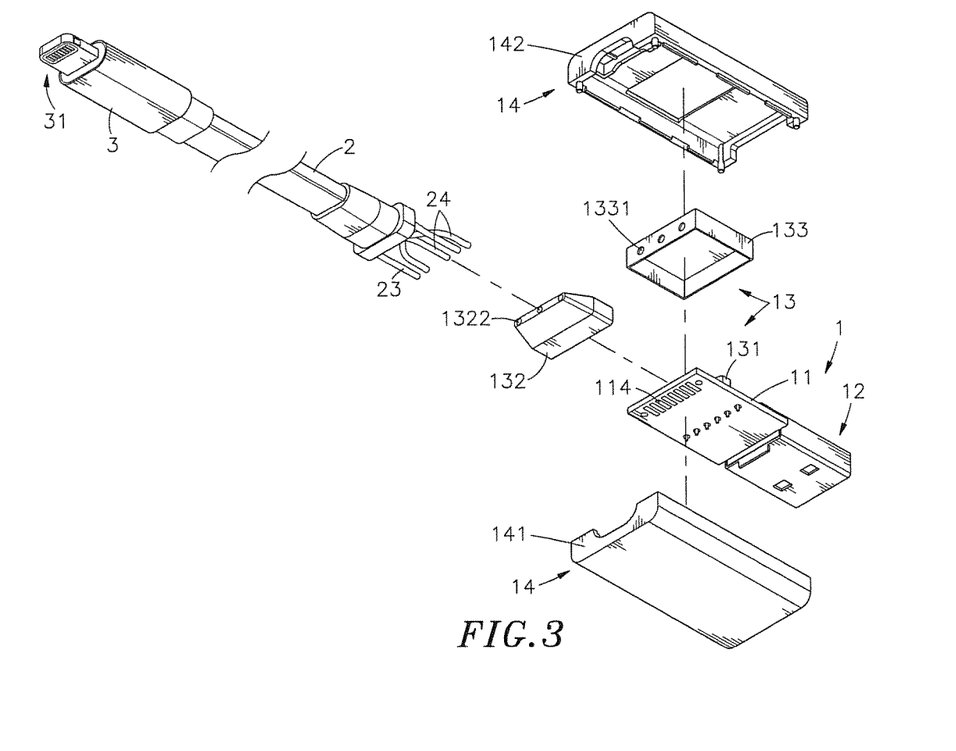
FIG. 3 shows a stereo disassembly view of the present invention from another angle of view.
Figure 4:
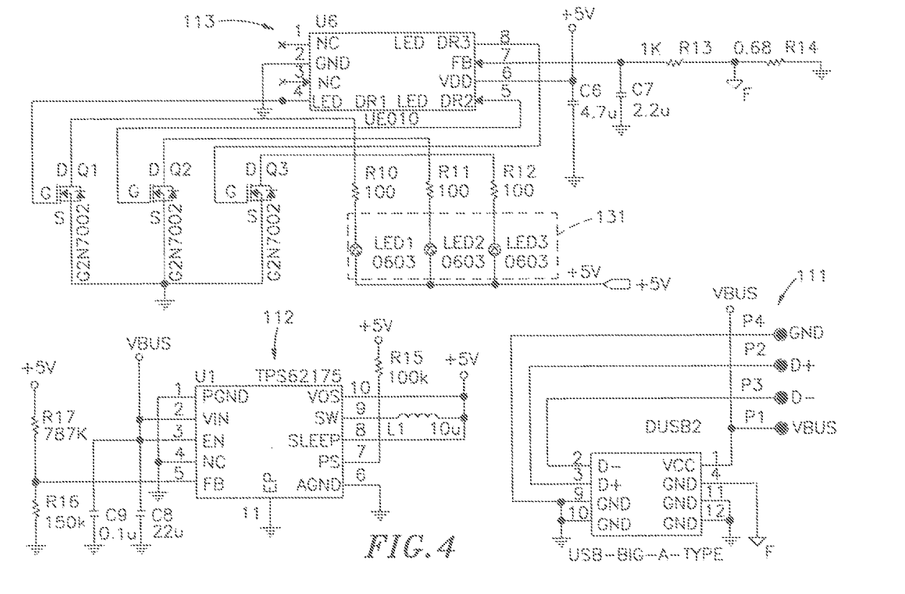
FIG. 4 shows an electric circuit diagram for the circuit board of the present invention.

Furthermore, the first connection part 12 of the first plug 1 is preferably embodied as a USB 2.0 Type-A transmission interface and includes 4 terminals; in practice, however, it can be alternatively implemented as a USB3.0 Type-A, USB3.1 Type-C or other USB transmission interfaces of different specifications and types, based on application demands. If the first connection part 12 exemplarily conforms to the USB2.0 Type-A specification as illustrated herein, the four terminals of the terminal set 122 can be welded to the corresponding junction points of the USB interface circuit 111 to form an electrically conductive path, thus constituting a USB plug along with the base 121 and the shielding shell 123. Meanwhile, a fixation base 132 is combined to the exterior of the LEDs 131 in the light source module 13, a plurality of through-channels 1321 arranged in a lateral interval are installed in the interior of the fixation base 132 from the front side to the rear side, the lens or the package (not shown in the Figures) in each of the LEDs 131 can respectively extend backwardly into the through-channel 1321, and the positioning holes 1322 penetrating and extending to the outside and having a smaller hole diameter than of the through-channel 1321 are installed on the rear side of the through-channel 1321.

Furthermore, the exterior of the LEDs 131 and fixation base 132 of the aforementioned light source module 13 can be further covered by a case 133 positioned on the circuit board 11, and a plurality of through-holes 1331 corresponding to the positioning holes 1322 for connections can be configured on the rear side of the case 133 thereby protecting the interior against dusts or particles by means of the fixation base 132 along with the case 133 so as to offer good dustproof, antifouling features. Besides, a seat body 14 can be integrally formed using wrapping mold injections of plastic materials on the circuit board 11 and the first connection part 12 of the first plug 1, or it is possible to combine the bottom seat 141 and the outer lid 142 of the seat body 14 via assemblages, and then the first connection part 12 stretches out to the front side of the seat body 14.

Figure 5:
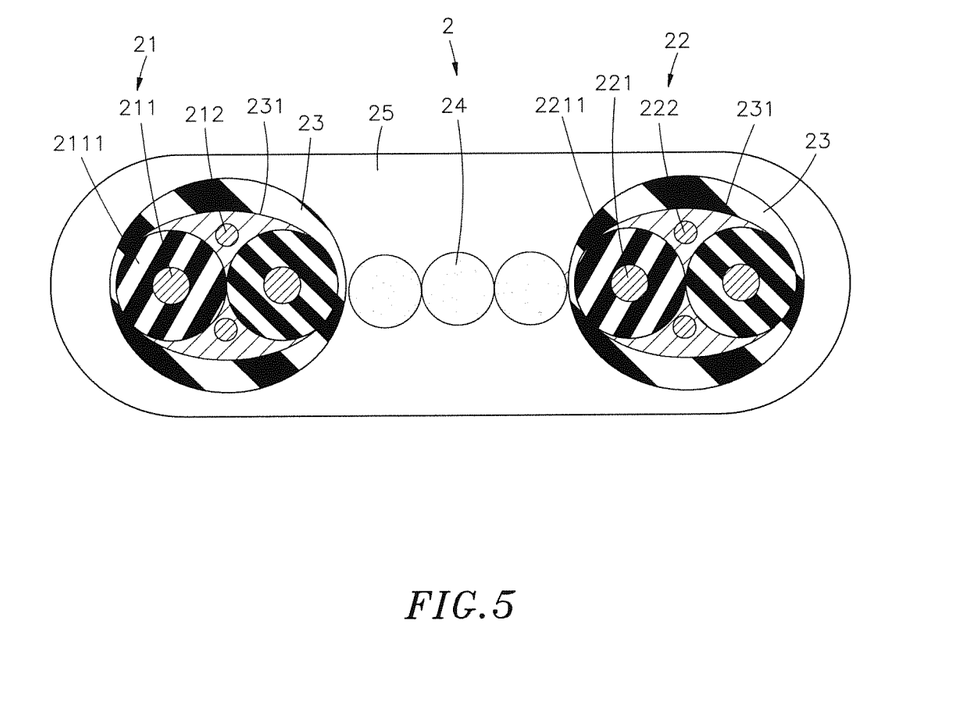
FIG. 5 shows a cross-section view for the transmission cable of the present invention.

The transmission cable 2 includes a signal line set 21, an electric power line set 22, a middle cladding layer 23, at least two optical fibers 24 located between the signal line set 21 and the electric power line set 22, as well as an outer protective layer 25, in which at least two signal lines 211 having an insulating layer 2111 on the exterior are installed in the signal line set 21 and the grounding lines 212 are respectively installed on the upper and lower sides of the signal lines 211. Additionally, at least two electric power lines 221 having an insulating layer 2211 are installed in the electric power line set 22, and the grounding lines 222 are respectively installed on the upper and lower sides of the electric power lines 221, in which the electric power line set 22 and the signal line set 21 are essentially of the same structure, and the differences between them exist merely in the transmissions for electric power, signals or grounding, as well as specifications regarding to conductive line diameters (AWG).

Moreover, the peripheries of the signal line set 21 and the electric power line set 22 can be respectively enveloped by the middle cladding layer 23 of thermoplastic polyurethane (TPU) materials, and an isolating wrap layer 231 containing an aluminized polyester film or a MYLAR plate can be enveloped between the middle cladding layer 23 and the electric power line set 22, the signal line set 21, respectively. The middle cladding layer 23 can also have different colors to allow variations in its appearance. The outer protective layer 25 encapsulating the peripheries of the signal line set 21, electric power line set 22, middle cladding layer 23 and the optical fibers 24 can be made of polyvinyl chloride (PVC) materials featuring high transparency so as to provide good stretching strength and tearing strength, thus enabling bright product appearance and smooth touch feeling suitable for fabricating flat-shaped cables.

Upon assembling the transmission cable 2 and the first plug 1, each of the signal lines 211, electric power lines 221, grounding lines 212, 222 in the signal line set 21 and the electric power line set 22 can be respectively welded onto a corresponding junction point 114 on the circuit board 11 thus forming electric connections therewith, and the optical fibers 24 respectively penetrate through the through-holes 1331 of the case 133, then insert into a corresponding positioning hole 1322 on the fixation base 132. Subsequently, the optical fiber 24 can be inserted and positioned under the guidance of the positioning hole 1322 so that the terminal plane of the optical fiber 24 can be closely abutted against the LED 131 to form a light transfer path thus facilitating the aligned connection of the optical fiber 24 and eliminating possible deviation or tilt issues; following this, the bottom seat 141 and outer lid 142 of the seat body 14 can be integrally combined onto the first plug 1 and the transmission cable 2, and the transmission cable 2 can extend out to the rear side of the seat body 14, thus completing the entire assemblage of the present invention.

Figure 1:
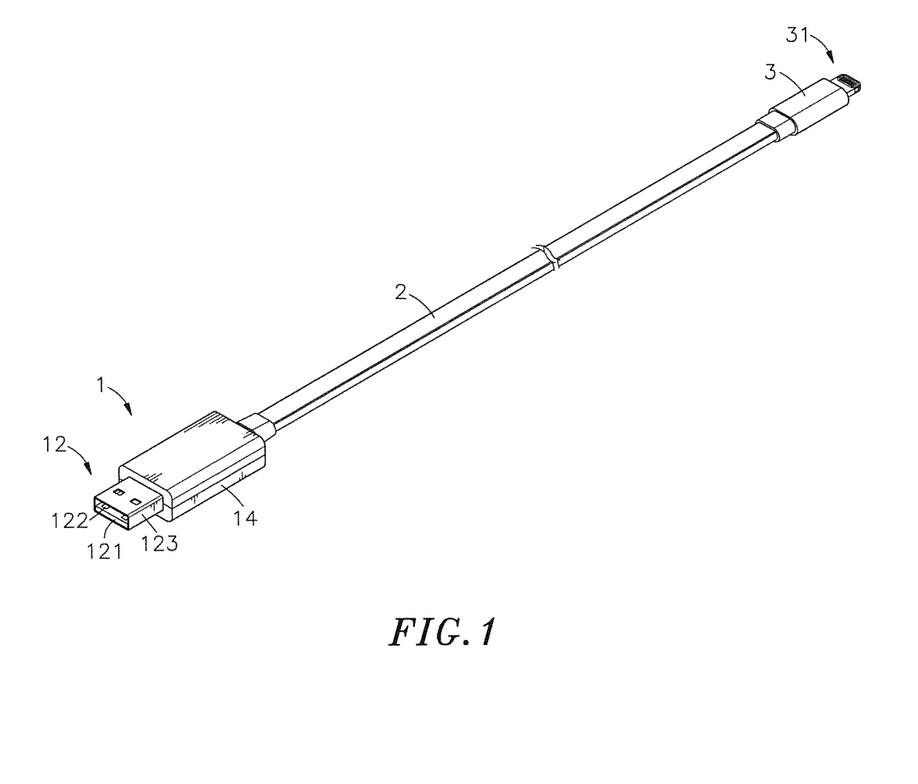
FIG. 1 shows a stereo perspective view of the present invention.

Herein a second plug 3 having a second connection part 31 can be configured on the other side of the aforementioned transmission cable 2 opposite to the first plug 1 such that the second connection part 31 can be connected onto the signal line set 21 and the electric power line set 22 to constitute an electrically conductive path, and the second plug 3 may be preferably embodied as a transmission interface conforming to the Apple Lightning (a trade mark of Apple Inc. registered at the United States Patent and Trademark Office). But, in practice, Micro-USB, USB3.1 Type-C, Mini-USB or a transmission interface of other specification and type may be also applied to allow the transmission cable 2 to be connected to a host end on a personal computer, notebook computer or the like via the first plug 1; or alternatively, the first plug 1 may be connected to a power recharger connected to a power grid socket for power supply, while the second plug 3 is connected to a user end of a mobile device, e.g., smartphone, tablet computer, for data transmission or power recharging actions. However, it should be understood that, since many transmission interface specifications and types may be utilized in the connection of the second plug 3 collectively with the first plug 1 and the transmission cable 2 and the details of such a construction are not critical to the present invention, further descriptions thereof are omitted for brevity.

Figure 6:
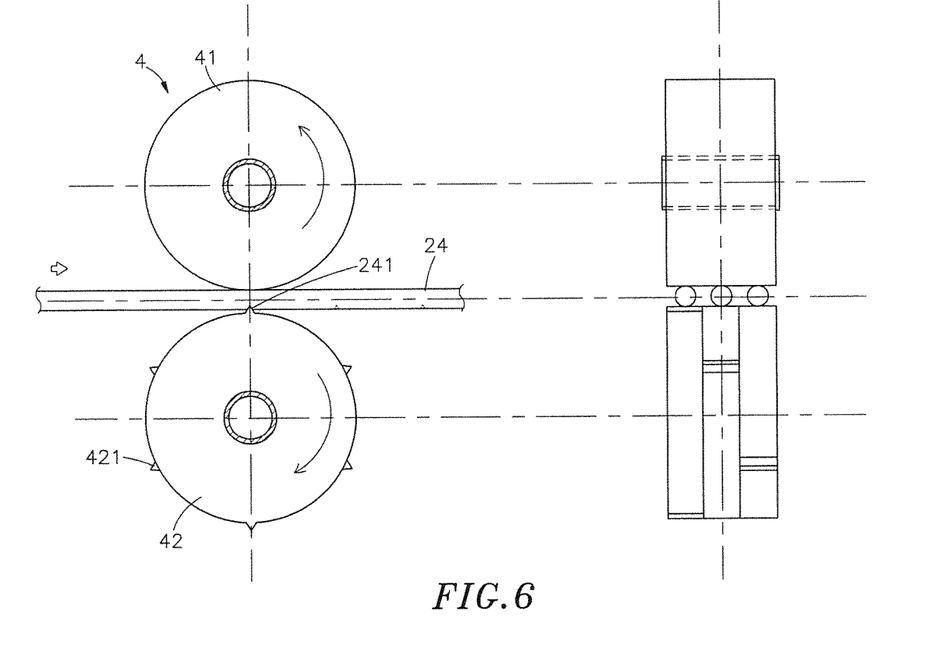
FIG. 6 shows a diagram for the optical fibers of the present invention upon performing the pressure punching operation.
Figure 7:
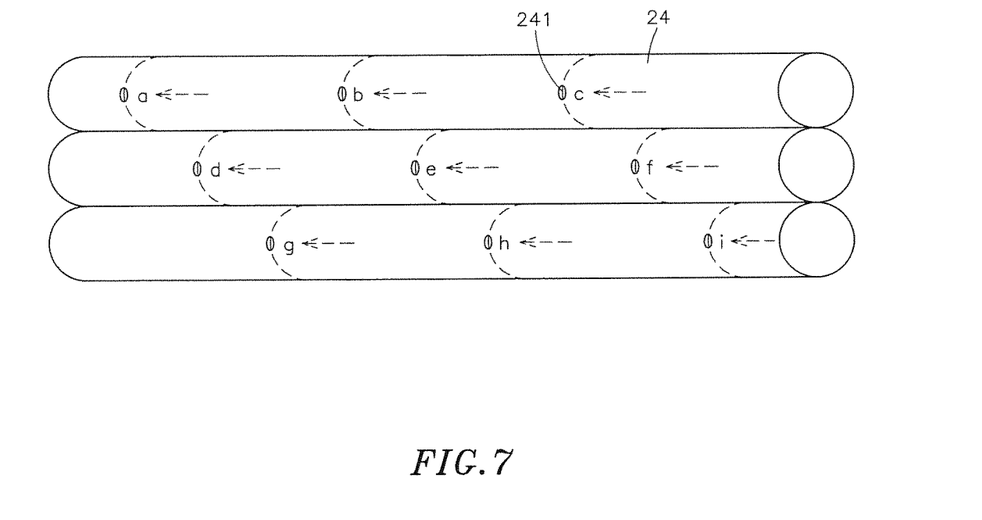
FIG. 7 shows a state diagram for the optical fibers of the present invention upon performing the light-streaming operation.

Next, refer to FIGS. 6 and 7, wherein a diagram for the optical fibers of the present invention upon performing the pressure punching operation and state diagram for the optical fibers upon performing the light-streaming operation are respectively shown. It can be clearly seen from the Figures that, to achieve a stream-wise point-punched form on the surfaces of the three single-cored optical fibers 24 in the transmission cable 2, a flat pressure roller 41 of a point punching machine 4 can roll in conjunction with three parallel precise tile opening bulging rollers 42 to punch on the optical fibers 24 passing through in between thereby point punching to each of the optical fibers 24 by a plurality of rolling teeth 421 ring-wise arranged on the outer surfaces of the tile opening bulging rollers 42 such that a plurality of light spots 241 arranged at an equal distance can be formed on the surface of the optical fiber 24 in order to present the stream-wise illuminating effect. The outer surfaces of such three tile opening bulging rollers 42 include a plurality of rolling teeth 421 formed in accordance with a preset fixed interval using precise molding tools can ensure the distance between the light spots 241 punched on each optical fiber 24 to be identical, and the punch depths of such light spots 241 of the optical fibers 24 can be maintained consistently through controlling the constant pressure applied on the flat pressure roller 41, so the integral illuminating effect can be better coordinated and more versatile thus improving the usability and aesthetic feature thereof.

In operation, the controller 113 in the input end of the first plug 1 can drive the LEDs 131 of the light source module 13 to sequentially generate light of different colors or of variances, and light is respectively projected toward the optical fibers 24 of the transmission cable 2 such that light can pass through the light spots 241 of the optical fibers 24 and deflect to present a stream-wise lighting state demonstrating successive and progressive light chasings of splendid and abundant colorfulness sequentially per segment. The controller 113 can also drive the LEDs 131 to operate in cooperation with the optic fibers 24 thereby simulating the flow direction and state of signal transmission or power recharging operations, with a lighting order of "a-b-c/d-e-f/g-h-i/ . . . ", sequentially. Suppose the electricity amount in the mobile device or equipment of the user end connected to the second plug 3 is below 65%, the controller 113 may modulate the LEDs 131 so that the light spots 241 of the optical fibers 24 show an illumination of stronger mobility for faster flow speeds; on the contrary, if the electricity amount exceeds 65%, the controller 113 may modulate the LEDs 131 so that the light spots 241 of the optical fibers 24 may present an illumination for slower flow speeds; in case the electricity amount in the mobile device or apparatus is saturated, the controller 113 may automatically stop driving the LEDs 131 such that the optical fibers 24 do not illuminate. It is possible as well to apply the controller 113 in cooperation with the LEDs 131 of different colors in themselves to further implement various colorful and versatile dynamic lighting styles such as blinking color, light flow, skipping, progressive color alternations etc., thereby achieving numerous dynamic, magnificent and colorful lighting effects and improving the competitive strength of the products.

As such, the present invention essentially addresses on that, a first connection part 12 is configured on one side of the circuit board 11 in the first plug 1, a light source module 13 having at least two LEDs 131 is configured on the circuit board 11, and a middle cladding layer 23 is enveloped respectively around the peripheries of the signal line set 21 and the electric power line set 22 in the transmission cable 2 connected by a plurality of junction points 114 on the circuit board 11; meanwhile, at least two optical fibers 24 respectively corresponding to the LEDs 131 and the transparent outer protective layer 25 wrapped on the peripheries thereof are installed between the signal line set 21 and the electric power line set 22, a plurality of light spots 241 arranged at an interval are configured on the surfaces of the optical fibers 24, and a second plug 3 is installed on the other side of the transmission cable 2 opposite to the first plug 1, which are the major items to be protected. When the controller 113 on the circuit board 11 drives the LEDs 131 to individually project light toward the optical fibers 24 sequentially, light can pass through the light spots 241 and present a stream-wise lighting state demonstrating successive and progressive light chasings sequentially per segment, and since the distances between such light spots 241 of the optical fibers 24 are completely identical and the punched depths can be maintained consistently, the integral illuminating effect can be better coordinated and more versatile thus improving the usability and aesthetic feature thereof.

The aforementioned detailed descriptions have been set forth merely with regards to a preferred embodiment of the present invention, but the illustrated embodiment is by no means intended to restrict the scope of the present invention. Accordingly, all other effectively equivalent changes, modifications and alternations made without departing from the scope and spirit of the present invention should be considered as falling within the coverage defined hereunder by the claims of the present invention.

In summary, the flat optical fiber light-streaming cable according to the present invention is capable of, in practice, achieving the aforementioned effects and objectives thus demonstrating the values thereof with regards to usefulness and innovation and fulfilling the requirements on patent applications, so the present application is herein submitted based on relevant regulations in order to legally protect the inventor's efforts for the present invention. Should there be any questions or instructions from the examiners of your Office, the inventor of the present invention will be very pleased to cooperate and provide any further information concerning the present application in details.

What is claimed is:

1. A flat optical fiber light-streaming cable comprises a first plug, a transmission cable and a second plug, wherein:
    the first plug includes a first circuit board, a first connection part conforming to the USB specification is installed on one side of the circuit board, a light source module having at least two light emitting diodes (LEDs) is installed on the circuit board, a USB interface circuit connected to the first connection part is set up on the circuit board, a processing circuit is connected to the USB interface circuit, and such a processing circuit is connected respectively to a controller for driving the LEDs to generate light sequentially as well as to a plurality of junction points thereby forming an electrically conductive path;
    the transmission cable includes a signal line set and an electric power line set connected onto the junction points of the circuit board thereby forming an electrically conductive path, the peripheries of the signal line set and the electric power line set are enveloped by a middle cladding layer, at least two optical fibers respectively corresponding to the LEDs to form a light transfer path are installed between the signal line set and the electric power line set, a plurality of light spots arranged at an equal distance are formed on the surfaces of the optical fibers, and the peripheries of the signal line set, the electric power line set, the middle cladding layer and the optical fibers are enveloped with a transparent outer protective layer; and
    the second plug is connected to the other side of the transmission cable opposite to the first plug, and when the controller drives the LEDs to respectively project light toward the optical fibers sequentially, light can pass through the light spots on the optical fibers and present a stream-wise lighting state demonstrating successive and progressive light chasings sequentially per segment.

2. The flat optical fiber light-streaming cable according to claim 1, wherein the first connection part of the first plug includes a base, a terminal set connected onto the USB interface circuit of the circuit board is positioned on the base, and a shielding shell is combined to the exterior of the base.

3. The flat optical fiber light-streaming cable according to claim 1, wherein a fixation base is combined to the exterior of the LEDs in the light source module, a plurality of through-channels arranged in a lateral interval for individually inserting the LEDs through are installed in the interior of the fixation base, and the positioning holes having a smaller hole diameter thereby guiding the optical fibers to be aligned and inserted for connections are installed on the rear side of each through-hole.

4. The flat optical fiber light-streaming cable according to claim 3, wherein the exterior of the LEDs and the fixation base of the light source module is covered with a case positioned on the circuit board, and a plurality of through-holes allowing optical fibers to pass through are installed on the rear side of the case corresponding to the positioning holes.

5. The flat optical fiber light-streaming cable according to claim 1, wherein a seat body capable of positioning the circuit board and the first connection part is installed on the first plug thereby allowing the first connection part to extend out to the front side of the seat body and the transmission cable to extend out to the rear side of the seat body.

6. The flat optical fiber light-streaming cable according to claim 1, wherein at least two signal lines having an insulating layer on the exterior are installed in the signal line set of the transmission cable, and a grounding line is set up respectively on the upper and lower sides at the middle of the signal lines.

7. The flat optical fiber light-streaming cable according to claim 1, wherein at least two electric power lines having an insulating layer on the exterior are installed in the electric power line set of the transmission cable, and a grounding line is set up respectively on the upper and lower sides at the middle of the electric power lines.

8. The flat optical fiber light-streaming cable according to claim 1, wherein an isolating wrap layer is enveloped respectively between the middle cladding layer and the electric power line set as well as the signal line set of the transmission cable, and the isolating wrap layer is an aluminized polyester film or a MYLAR plate.

* * * * *